United States Patent [19]

Allen

[11] 4,261,545
[45] Apr. 14, 1981

[54] FLUSH VALVE PISTON HAVING FILTERED ORIFICE

[75] Inventor: Charles S. Allen, River Forest, Ill.

[73] Assignee: Sloan Valve Company, Franklin Park, Ill.

[21] Appl. No.: 135,230

[22] Filed: Mar. 31, 1980

[51] Int. Cl.³ ............... F16L 47/00; F16K 31/122
[52] U.S. Cl. .......................... 251/40; 138/40; 251/120
[58] Field of Search ............ 251/38, 39, 40, 41, 251/42, 43, 44, 118, 120, DIG. 1; 138/40, 41, 42

[56] References Cited

U.S. PATENT DOCUMENTS

| | | | |
|---|---|---|---|
| 1,610,683 | 12/1926 | Kellan | 251/38 |
| 1,868,591 | 7/1932 | Tanner | 251/40 |
| 1,919,408 | 7/1933 | Work | 138/40 |
| 2,046,004 | 6/1936 | Sloan | 251/40 |
| 2,406,259 | 8/1946 | Russell et al. | 251/40 |
| 3,279,742 | 10/1966 | Billeter | 251/44 |

FOREIGN PATENT DOCUMENTS

| | | | |
|---|---|---|---|
| 1450671 | 3/1969 | Fed. Rep. of Germany | 251/DIG. 1 |
| 410944 | 5/1934 | United Kingdom | 251/40 |

Primary Examiner—Martin P. Schwadron
Assistant Examiner—G. L. Walton
Attorney, Agent, or Firm—Kinzer, Plyer, Dorn & McEachran

[57] ABSTRACT

A small orifice in a flush valve piston is provided with a filter means to prevent sedimentary deposits from clogging the orifice. The filter is formed by providing a generally three-sided channel around the piston. The channel is located such that the orifice opens into the base of the channel. A resilient sealing ring is seated on the channel to close the open side of the channel. A plurality of grooves extend from the interior of the channel, under the sealing ring and to the exterior of the piston. These grooves are sized to prevent entry of sedimentary deposits into the channel while permitting entry of water in the channel. The grooves are individually small compared to the orifice opening but they are sufficient in number to provide an adequate supply of water to the orifice.

9 Claims, 6 Drawing Figures

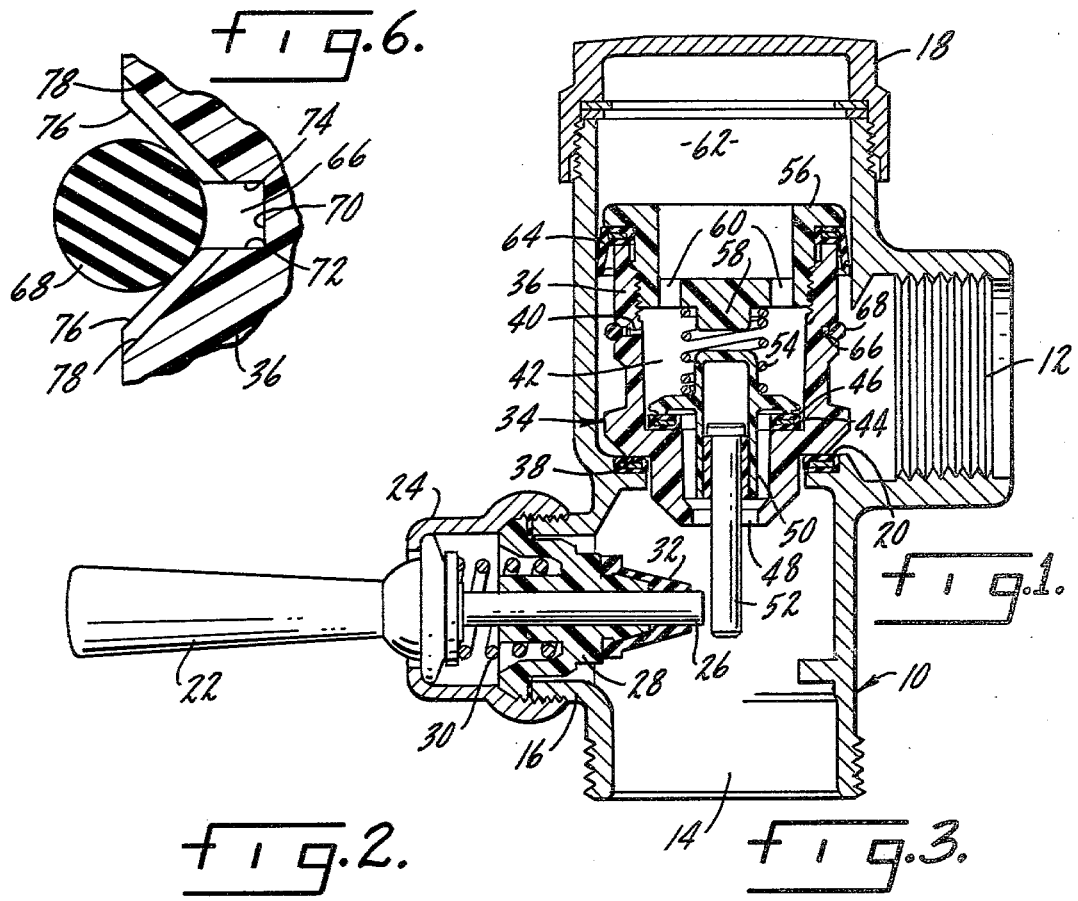
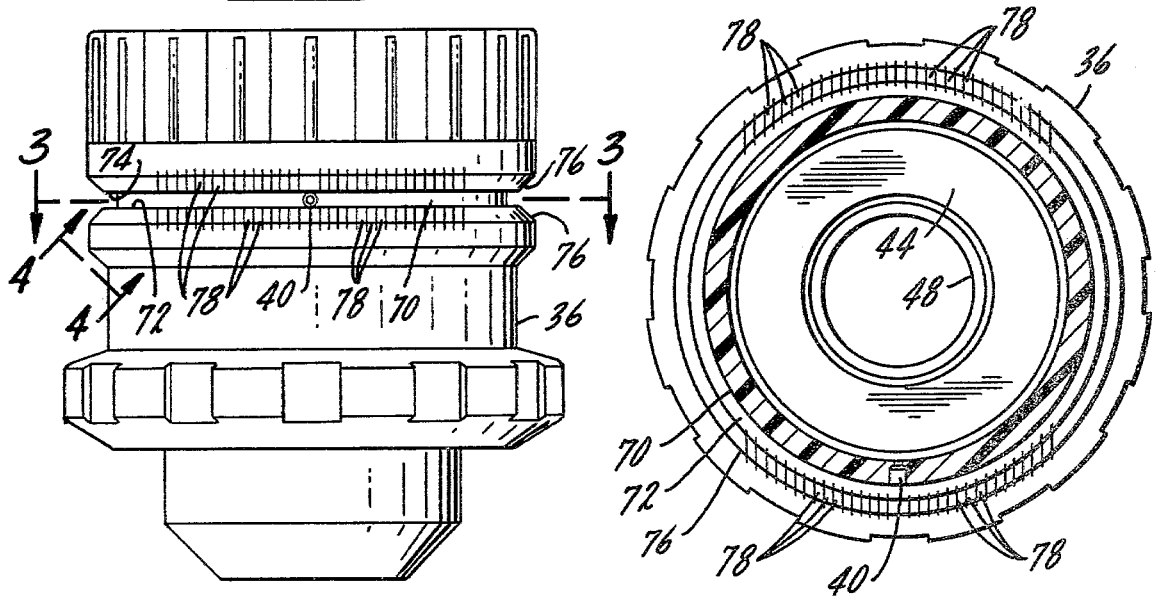
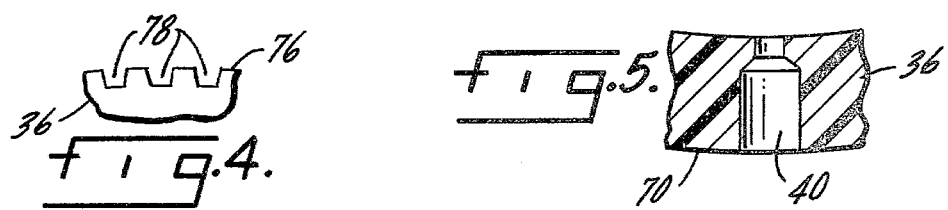

FLUSH VALVE PISTON HAVING FILTERED ORIFICE

SUMMARY OF THE INVENTION

This invention relates in general to improvements in flush valves or urinals and other plumbing equipment. In particular, the invention relates to filter means for preventing clogging of a small orifice in the piston of such a flush valve.

A primary object of the present invention is a filter means of the type described which can be formed without any close tolerance parts.

Another object is a filter which is easily assembled.

Another object is a filter which can be easily disassembled for cleaning.

Another object is a filter which can be readily formed in plastic molding processes.

Another object is a filter which allows sufficient water flow even after portions of the filter become clogged with trapped sediment.

Other objects will appear in the following specification, drawings and claims.

BRIEF DESCRIPTION OF THE DRAWINGS

FIG. 1 is a cross-sectional elevation view of the flush valve including the filtered orifice.

FIG. 2 is an enlarged side elevation view of the piston unit.

FIG. 3 is a section taken along line 3—3 of FIG. 2.

FIG. 4 is a further enlarged side elevation view of the filter grooves, taken along line 4—4 of FIG. 2.

FIG. 5 is an enlarged plan view of a section through the piston side wall at the orifice. FIGS. 4 and 5 are drawn on the same scale.

FIG. 6 is an enlarged view showing the details of the filter of the present invention.

DESCRIPTION OF A PREFERRED EMBODIMENT

This invention relates to a filter means for an orifice in a flush valve piston or other plumbing equipment. A flush valve of the type in which the present invention may be advantageously employed is shown in FIG. 1. The flush valve has a generally hollow body 10 which includes an inlet connection 12, an outlet connection 14 and a handle coupling connection 16. The top of the valve body is closed by a cover 18. A main valve seat 20 is formed on the interior walls of the body 10.

The valve is actuated by an operating handle 22 which is fastened to the valve body 10 by means of a coupling nut 24. The handle is connected to a plunger 26 which extends to the interior portion of the valve body. The plunger 26 is guided and supported by a bushing 28 and restored by a spring 30. A rubber sealing cap or packing 32 is snapped on the end of bushing 28 and prevents leakage outward from the handle opening.

A piston assembly, indicated generally at 34, is adapted to reciprocate within the body 10. The assembly 34 includes a hollow, generally cylindrical piston unit 36. The piston 36 has a lower stepped portion 38 which normally is seating upon and closing the main valve seat 20 to control the water flow through the flush valve.

The piston 36 has a by-pass or orifice 40 in its side wall to provide fluid communication to the piston interior chamber 42. The by-pass has a small diameter, on the order of 0.020 inches, which is susceptible to clogging by sedimentary deposits and the like found in the water running through the valve. The present invention is directed to prevent clogging of the by-pass 40.

The interior chamber 42 of the piston 36 has an annular ledge 44 supporting a seal 46. The ledge and seal are at the top of a central, lower opening 48 at the bottom of the piston.

The piston assembly 34 also includes a relief valve 50 which normally closes the lower opening 48 of the piston 36. The relief valve has a collar which engages the seal 46 on the annular ledge of the piston. An operating stem 52 is slideable in the central, hollow portion of the relief valve 50. The operating stem extends to a point adjacent the plunger 26. A spring 54 assists in holding the relief valve 50 in its sealing position.

The piston assembly 34 further includes an insert 56 threadedly engaging the upper piston wall. The insert 56 has a central stop 58 against which the spring 54 abuts. The stop has holes 60 which provide fluid communication between the piston interior chamber 42 and an upper pressure chamber 62. A packing member 64 held between the insert 56 and piston 36 provides a slideable seal separating the pressure chamber 62 from the inlet water pressure.

The operation of the flush valve is as follows. In the normal closed position of the flush valve, the water pressure at the inlet supply 12 is present at the exterior of the piston 26 and extends via the by-pass 40 and the piston interior chamber 42 and holes 60 into the pressure chamber 62. Because of the greater area on top of the piston assembly 34 upon which the pressure manifests itself compared to the area around the valve seat 20, the pressure differential holds the piston 36 firmly closed on the valve seat 20. When the operating handle 22 is oscillated in any direction it forces the plunger 26 inward against the relief valve stem 52, thereby tilting the relief valve 50 off its seat on the seal 46. This permits the pressure in the chamber 62 to be relieved through the holes 60, the piston interior chamber 42 and the lower opening 48 into the outlet 14 of the flush valve. The inlet water flow can now raise the piston assembly 34 off of the valve seat 20, permitting full water flow from the inlet 12 to the outlet 14 to flush the fixture to which the flush valve is connected.

In case the operating handle 22 is held operated unduly long, the flush valve will perform its flushing cycle regardless and shut off. This is accomplished by the lower end of the relief valve stem 52 coming to rest on top of the plunger 26 and telescoping within the hollow portion of relief valve 50. As a result, the relief valve closes upon the seal 46, assisted by the spring 54 and gravity, thereby closing off the pressure chamber 62. This permits the differential pressure to create flow into the pressure chamber 60 through by-pass 40, slowly forcing the piston assembly 34 downward and finally closing the valve seat 20 to again shut off the water flow.

It can be seen from the foregoing description that operation of the flush valve requires that the by-pass remain completely free of any debris which may be found in the water. The present invention accomplishes this by providing a filter means which is simple to manufacture and maintain and also effective in operation.

Looking at FIG. 1, the filter means includes an annular channel 66 formed on the exterior portion of the piston. The channel 66 and by-pass 40 are located on the piston such that the by-pass 40 opens into the base of the channel. So water flowing into the by-pass must first enter the channel 66. A resilient annular sealing ring 68 is seated on the top of the channel to close the open side thereof. The sealing ring 68 allows water to enter into the channel 66 only through specially formed passage means, as will be explained below.

Looking now at FIGS. 2, 3 and 6 the details of the filter means are more clearly illustrated. The channel 66 includes a base 70 and lower and upper walls 72 and 74. The outer portions of the sidewalls are beveled as at 76 to provide an improved seat for the sealing ring 68. It will be understood that other shapes for the channel are possible.

A plurality of passage means or grooves 78 extend from the interior of the channel, under the sealing ring and to a point at the exterior of the piston. In a preferred embodiment these grooves are located at the beveled surfaces 76 of both channel walls 72 and 74. In effect the grooves undercut the sealing ring 68 to provide fluid communication to the interior of the channel. However, the grooves are small enough to prevent entry of any particles of debris which could clog the by-pass 40. Preferably, the groove width is such that the grooves are individually smaller than the by-pass 40, but collectively they are much larger than the by-pass 40. So sufficient water is allowed into the interior of the channel to assure proper operation of the valve. Furthermore, the grooves are numerous enough that even though some of them may become clogged there is still a sufficient number of open grooves to permit proper operation of the valve.

An enlarged cross-section of the grooves is shown in FIG. 4. As can be seen in comparison with the size of the by-pass 40 shown in FIG. 5, any particle small enough to fit through the grooves 78 will also flow through the by-pass. FIG. 3 illustrates that there are no grooves provided directly opposite the by-pass 40. FIG. 3 also illustrates that all the grooves run in the same direction. Since the piston is preferably made from a plastic material this arrangement of the grooves is convenient for molding purposes. One of the advantages of the present invention is the filter is formed without any close tolerance parts. This makes the filter much easier to manufacture and assemble. Furthermore, the sealing ring 68 can be readily removed to allow cleaning of the filter. Another advantage of the filter of the present invention is it can be formed entirely in the piston. No cooperating parts external to the piston are required. This is important because during the service life of a valve, the piston will wear and eventually have to be replaced. So the piston will be supplied both as original equipment and as a separate, replacement part. The self-contained filter eliminates any problems of matching replacement parts to used valve components.

It is of course to be understood that the various details of structure and arrangement of parts may be changed or modified without departing from the spirit and scope of the invention or exceeding the scope of the appended claims.

I claim:

1. In a flush valve, a hollow body having an inlet and an outlet therein with a valve seat formed around said outlet, a piston in said body normally closing said valve seat and providing a pressure chamber above said piston, said piston having a by-pass extending therethrough for passage of water into the pressure chamber from said inlet, and filter means interposed between said by-pass and inlet for precluding entry of sedimentary deposits in said by-pass tending to clog the by-pass, said filter means comprising an annular channel on said piston said channel having a base and having upper and lower walls, the channel being located such that said by-pass opens into the base of the channel, a resilient sealing ring seated on the channel to close the open side of said channel, and passage means in the form of a plurality of grooves formed on the upper and lower walls of the channel, the grooves extending from the interior of the channel, under the sealing ring and to the exterior of the piston, the grooves being individually smaller than the by-pass but collectively the grooves being larger than the by-pass to preclude entry of sedimentary deposits into said channel while allowing passage of water into the channel.

2. The structure of claim 1 further characterized in that said grooves are formed partially around the channel.

3. The structure of claim 1 further characterized in that no grooves are located directly opposite the by-pass.

4. The structure of claim 1 wherein the channel has beveled surfaces near its open side.

5. A piston for use in a flush valve of the type having a hollow body including an inlet and an outlet therein with a valve seat formed around said outlet, said piston normally closing said valve seat and providing a pressure chamber above said piston, said piston having a by-pass extending therethrough for passage of water into the pressure chamber from said inlet and filter means interposed between said by-pass and inlet for precluding entry of sedimentary deposits in said bypass tending to clog the by-pass, said filter means comprising an annular channel on said piston said channel having a base and having upper and lower walls, the channel being located such that said by-pass opens into the base of the channel, a resilient sealing ring seated on the channel to close the open side of the channel and passage means in the form of a plurality of grooves formed on the upper and lower walls of the channel, the grooves extending from the interior of the channel, under the sealing ring and to the exterior of the piston, the grooves being individually smaller than the by-pass but collectively the grooves are larger than the by-pass to preclude entry of sedimentary deposits into said channel while allowing passage of water into the channel.

6. In a fluid flow path which includes a movable control element for opening and closing said fluid flow path, said control element having an orifice therethrough, a filter means on the upstream side of the orifice for preventing entry of sediment into the orifice, said filter means comprising:
   a channel formed on said control element, said channel having a base and having upper and lower walls, the orifice opens into the channel; a resilient sealing member seated on the channel to close the side of the channel opposite the base; and passage means in the form of a plurality of grooves formed on the upper and lower walls of the channel, the grooves extending from the interior of the channel, under the sealing ring and to the exterior of the control element, said passage means providing fluid communication to the interior of the channel, said grooves being individually smaller than the orifice to preclude entry of sedimentary deposits into said channel while allowing passage of fluid into the channel.

7. The structure of claim 6 wherein the channel has beveled surfaces on the side walls near the open side of the channel.

8. The structure of claim 6 wherein the control element is a generally cylindrical piston and the channel and sealing member extend around the perimeter of said piston.

9. The structure of claim 8 wherein the passage means are formed partially around the channel.

* * * * *